INVENTOR
DANIEL SILVERMAN
BY
John D. Gassett
ATTORNEY

INVENTOR.
DANIEL SILVERMAN
BY John D. Gassett
ATTORNEY

United States Patent Office 3,559,413
Patented Feb. 2, 1971

3,559,413
ADJUSTABLE STINGER FOR USE IN LAYING PIPELINE IN WATER COVERED AREAS
Daniel Silverman, Tulsa, Okla., assignor to Pan American Petroleum Corporation, Tulsa, Okla., a corporation of Delaware
Filed Feb. 7, 1968, Ser. No. 703,680
Int. Cl. F16l 1/00
U.S. Cl. 61—72.3      9 Claims

ABSTRACT OF THE DISCLOSURE

A flexible stinger for use in laying pipelines from a floating barge in deep water. The stinger, which supports the pipe as it trails off the aft end of the barge, is composed of a plurality of trough or pipe-support sections. The trough sections are linked together by flexible or pivotal means. A float for each such trough section is positioned on the surface directly above the sections. Lines run from winches on the float to each end of each trough section. The floats are sufficiently large to support the trough sections and any pipe laid therein. Thus, by adjusting the length of the lines supporting the troughs, the stinger, composed of such trough sections, can be made to take any selected shape or contour.

---

This invention relates to a system for laying a pipeline from a barge floating on a body of water. It relates especially to an adjustable stinger which can support the pipe in any selected contour as it trails off the aft end of the pipe-laying barge.

In recent years more and more oil wells have been drilled in water covered areas such as the continental shelf in the Gulf of Mexico. As time passes, more and more of the world's supply of petroleum is produced from such wells. Before this produced oil can be used it, of course, must be transported to land. This can be done by either floating tankers or by the laying of pipelines from the wells to land. Wherever possible, it is usually desired that the oil be transported from the offshore wells to land through pipelines laid on a marine floor or bottom. In laying such pipelines it is a normal procedure to make up the pipeline joint by joint on a pipe-laying barge and let the made up pipe trail off the aft end of the barge. A portion of the pipe is resting on and supported by the sea floor and the other portion is unsupported from such point of support to the pipe-laying barge. If this portion of the pipe is not supported in some manner it may develop stresses which will cause the pipe to fail. The pipe in this unsupported section can take on various shapes, depending upon wave, currents, depth of the water, strength of the pipe, etc. It has been found that if the pipe is bent to too small a radius of curvature for that particular pipe, then that pipe may fail.

In order to prevent the pipe from taking too small a radius of curvature, it has been found desirable to support the pipe in a strong stinger or support means. In shallow water the stinger is generally a rigid beam structure hinged at one end at the stern of the barge and at the other end resting on bottom. The shape of this stinger is such that as the pipe rests on and is supported by the stinger, its curvature is within safe limits.

While this system has been of considerable help, it has certain limitations; for example, once the stinger is built its curvature is fixed. It should be noted here that many different conditions of laying pipe may cause the desired curvature to vary from day-to-day on the same barge in the same body of water and, indeed, it may even change in a matter of a horizontal distance of a mile or less where there is a rapid change in the depth of the water.

Also, in deep water the length of the stinger becomes prohibitively great for a rigid structure. This present invention provides such a system whereby the curvature of the stinger can be quickly and readily modified at will to conform to the desired or selected curvature. Also, the length of the stinger can be as great as desired for any selected depth of water.

BRIEF DESCRIPTION OF THE INVENTION

This invention concerns an apparatus for laying pipelines in water covered areas from a vessel supported by such body of water. It includes a stinger means trailing off the aft end of the pipe-laying vessel. The stinger means comprises a plurality of pipe-supporting trough sections including means flexibly connecting each adjacent section. There is a float for each such trough section. Lines, for supporting each pipe trough section, extend from such section to the float. Means are provided for adjusting the length of these support lines to adjust the depth of each pipe-support section independently to obtain a selected contour for the stinger.

Other objects and a better understanding of the invention can be had from the following description taken in conjuntcion with the drawings in which.

Figure 1:
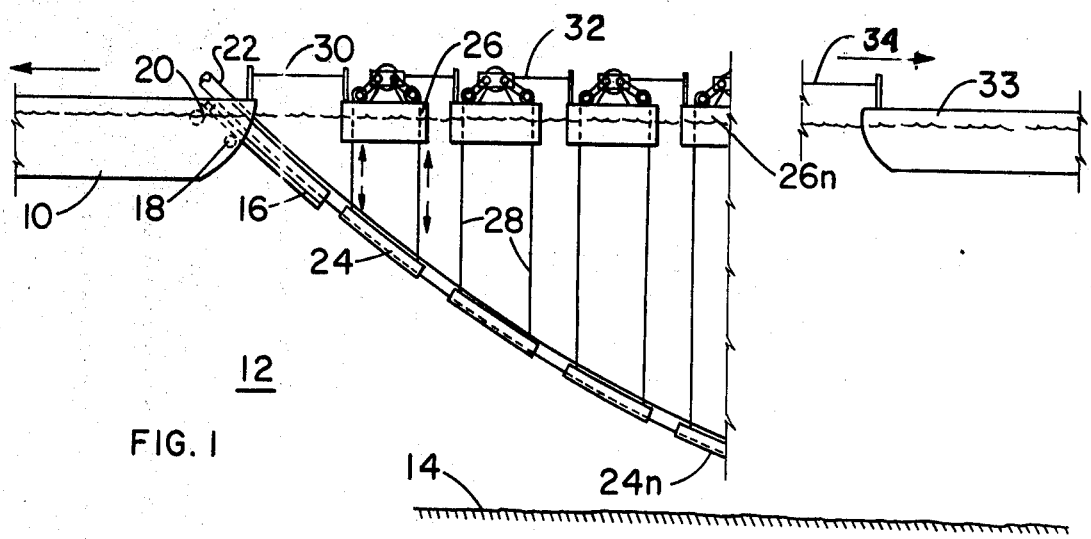
FIG. 1 illustrates a flexible stinger, according to this invention, trailing from the aft end of a pipe-laying barge.

Shown in FIG. 1 is a pipe-laying barge 10 supported on a body of water 12 having a bottom 14 upon which pipe is to be laid. A stinger section for supporting the pipe trails off the aft end of barge 10. This includes a first stinger section 16 which is attached to barge 10 by pivot 18. The angle which section 16 makes with the deck of barge 10 can be adjusted by means 20 which can be any mechanically, hydraulically or electrically operated means for moving section 16 about pivot 18. Pipe 22 which is to be laid is fed into stinger section 16 from barge 10 in any conventional manner. Ordinarily, the sections of pipe 22 are welded on as additional joints are needed and the entire pipe coated with a protective material before it is lowered. The new sections of pipe are ordinarily placed upon a titled work table assembly which takes the same angle with the deck of ship 10 as does the stinger section 16.

Also shown in FIG. 1 are a plurality of stinger trough or pipe-support trough sections 24 to 24n. These trough sections are connected together by flexible or pivotal means. Each trough section 24 is supported by a float 26 at the surface. Each float has adjustable lines 28 for supporting the pipe trough section. The first float 26 is held to barge 10 by line 30 and the floats are held together by individual lines 32. The last float 26n is connected to a tug 33 by line 34. Thus, the floats 26–26n are held in position by force being applied by the barge 10 in one direction through line 30 and by tugboat 33 through line 34 in the opposite direction. Each float contains means for raising and lowering independently each end of pipe trough section 24. Such means are more clearly shown in FIG. 2.

Figure 2:
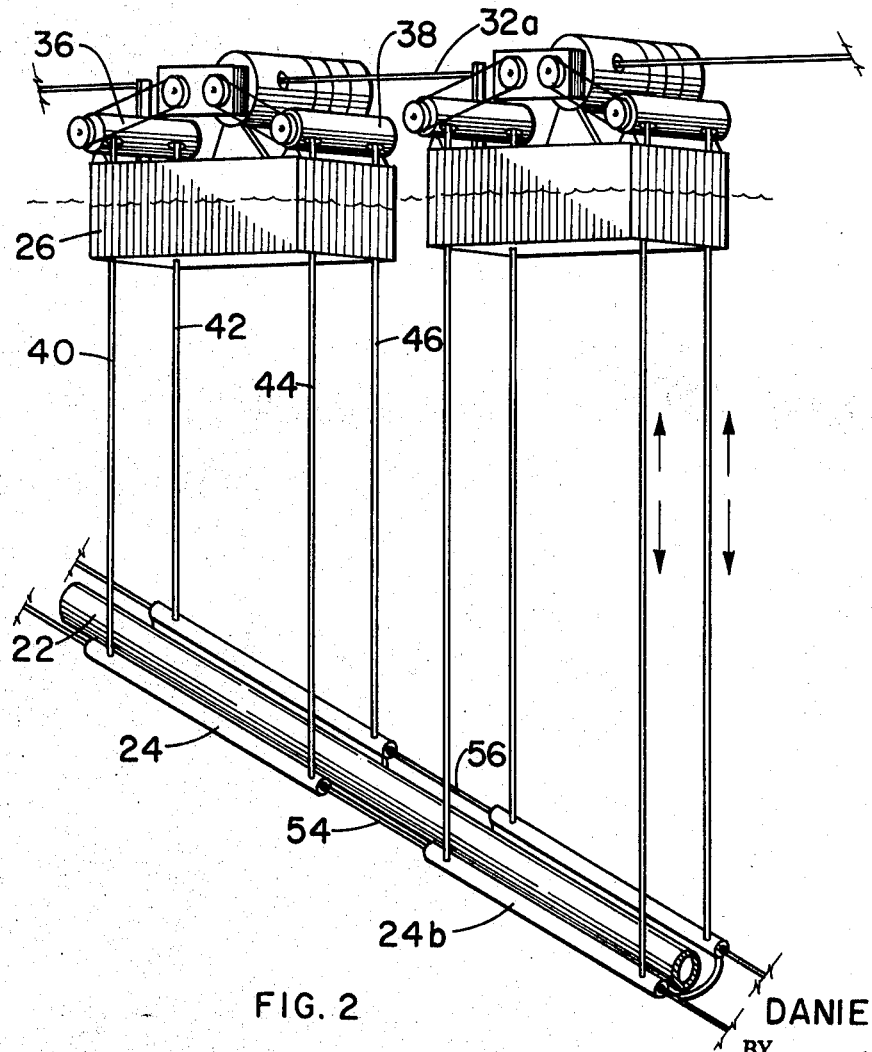
FIG. 2 illustrates an enlarged view of the float and pipe support trough sections.
Figure 3:
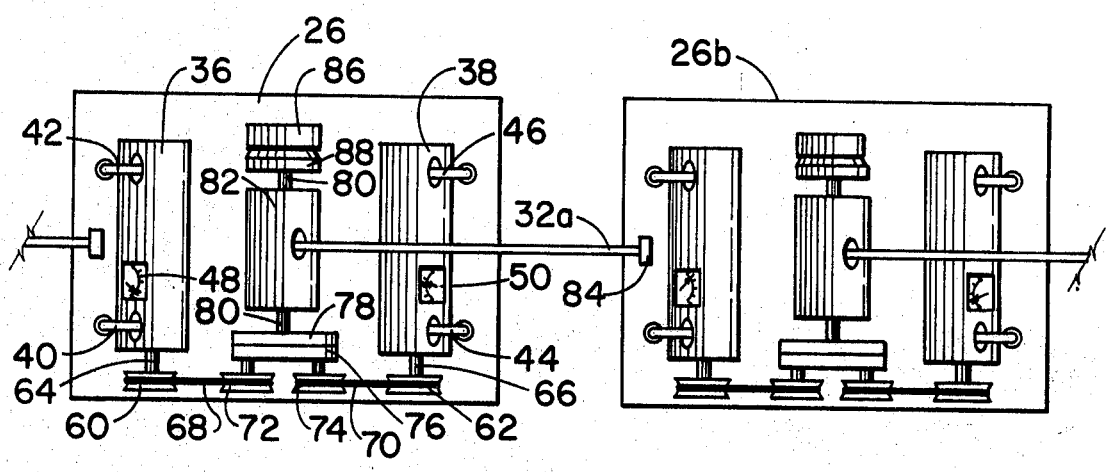
FIG. 3 illustrates a top view of FIG. 2.

Shown in FIG. 2 is pipe 22 supported by trough sections 24 and 24b. Float 26 has a first winch 36 and a second winch 38. These are ordinarily winches upon which lines can be wound or payed out and can be self-powered by electricity which could be supplied from the pipe-laying barge 10, for example. Winch 36 has lines 40 and 42 extending down to and connected to one end of pipe trough section 24. Winch 38 has lines 44 and 46 extending down to and connecting to the other end of pipe trough section 24. As can be seen in FIG. 3, each of these winches have indicating means 48 and 50, respectively, to indicate the amount of line which has been payed out by each winch. This, of course, is important when one wants to raise or lower the different sections 24 so as to effect a selected contour. Each float 26–26n has lines corresponding to lines 40, 42, 44 and 46 and winches 36 and 38.

Attention will now be directed toward the manner of connecting the various trough sections 24, 24b, etc. This includes flexible lines 54 and 56 which are connected at one end to trough section 24 and at the other end to the adjacent trough section 24b. By having these trough sections connected with flexible lines, nearly any selected contour can be met or at least closely approximated. In this regard, as an example, the length of sections 24, 24b are preferably from about 10 to about 24 feet. These lengths are sufficiently short that the troughs can be made sufficiently strong and, further, they are short enough so that various configurations of the overall stinger section can be more nearly met.

Figure 4:
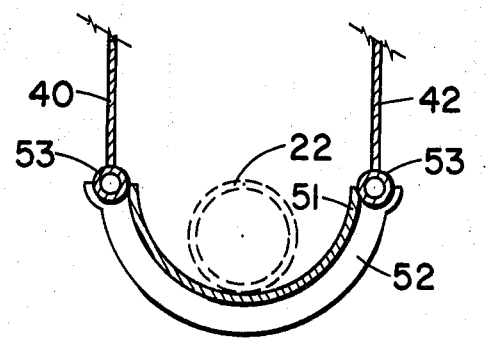
FIG. 4 illustrates a cross section of a pipe trough section.

FIG. 4 shows a typical cross section of pipe support trough 24 in which pipeline 22 is supported in the trough section supported by lines 40, 42. Each of the trough sections can be a concave member having a concave shell 51 longitudinally supported by tubular members 53 and re-enforced at spaced intervals by transverse ribs 52. Lines 54 and 56 can be attached at each end to tubular members 53 as by welding as shown in FIG. 2.

It is preferred to provide means whereby the floats can be pulled closer together or let further apart. The reason for this is that as adjacent pipe trough sections 24 are adjusted to make various angles with the horizontal plane, the horizontal distance between adjacent sections 24 and 24b become modified since flexible connecting lines 54 and 56 likewise vary their angle with the horizontal plane. Therefore, as the angle of sections 24 is varied, it is preferred to vary the distance between the floats 26. This can be accomplished either automatically or by manual control. We will first discuss means for doing this automatically. This can be seen perhaps best in FIG. 3. Shown thereon is a first pulley 60 and a second pulley 62 mounted on shafts 64 and 66, respectively, on winches 36 and 38. Pulleys 60 and 62 are connected through belts 68 and 70 to pulleys 72 and 74, respectively. These pulleys are connected to a differential gear mechanism 76 which is connected through clutch 78 and shaft 80 to a drum 82 upon which one end of line 32a is tied. The other end of line 32a is fixed to upright member 84 of the adjacent float 26b. By proper use of differential mechanism 76 it is seen then that as individual pipe support section 24 is set at different angles with the horizon that the length of line 32a is adjusted. This is done by taking in or paying out lines 40, 42, 44 and 46. If the lines are let out evenly then there is no differential movement of shaft 80 from differential gear 76. Thus, line 32a would stay the same. However, if lines 44 and 46 were let out more than lines 40 and 42 as might be necessary to obtain the right slope for section 24, then there would be rotation of shaft 80. Rotation of shaft 80 would rotate drum 82 and either take in or pay out line 32a as required. By proper calibration and design of the differential gear mechanism, length of line 32a is adjusted automatically in length according to the change of slope of section 24.

If it is desired to adjust the length of line 32a independently of the differential gear 76, clutch 78 is disengaged and a separate motor used to rotate drum 82. This includes a motor 86 having clutch 88 connected to shaft 80. By engaging clutch 88 and energizing motor 86, drum 82 can be rotated in a manually controlled manner.

It is believed that the operation of the apparatus of this invention is apparent. Briefly, one determines the contour which he wishes the pipe he is laying to have. He then adjusts the winches 36, 38 on each float 26 to obtain this contour. In doing this the length of lines 32 between the separate floats is adjusted so that the lines 40, 42, 44, 46, etc., remain essentially vertical to insure proper depth position of the pipe-support trough supported by such lines. The floats are held in place by a forward force being applied on line 30 by pipe-laying barge 10 and a reverse force applied to line 34 and support tug 32. Then as additional pipe is laid the pipe-laying barge 10, floats 26, support barge 33 and the stinger sections 24 are moved forward through the water, retaining the selected contour. As conditions warrant, the contour can be changed either by workmen on each float or by electric control and power from pipe-laying barge 10.

While the preferred embodiment of this invention involves a plurality of separate floats 26, each supporting one trough support means, it is possible to use a single large float instead of a plurality of smaller floats to correspondingly support a plurality of trough support means. This modification is equivalent to joining separate floats 26 by rigid connecting means. If all floats are rigidly connected together, then the support tug 33 is not required to maintain proper spacing between the separate winches 36, 38, etc., and corresponding support cables 40, 42, 44, etc., and troughs 24. If a rigid float system is used, the separate winches 36, 38, etc., can all be placed at one point on the float, or on the barge 10, with support cables being carried aft to pulleys over appropriate openings through the floats. This provides a simplification of the winch and winch drive means. Also, while the first trough support section 16 is shown as supported entirely from the barge, it is possible to use a float and support cables to support the outer end of this first trough.

While this invention has been described with a great deal of detail, it is possible to produce other embodiments without departing from the spirit or scope of the invention.

I claim:

1. An apparatus for laying pipe in water covered areas from a vessel supported by such body of water which comprises:

a stinger means comprising a plurality of elongated pipe-support sections having two ends, said pipe-support sections being connected to one another only by elongated, flexible members to provide a substantially continuous support for said pipe, one end of said stinger means supported by said vessel;

float means for supporting said pipe-support sections;

adjustable means vertically supporting each end of each said pipe-support section from said float means at a predetermined depth below the surface of said water, said float means having sufficient buoyancy to remain afloat while supporting said stinger means.

2. An apparatus as defined in claim 1 in which said float means comprises a plurality of floats, each float supporting one pipe-support section, one end of said float means tied to said vessel.

3. An apparatus as defined in claim 2 including flexible lines connecting adjacent floats.

4. An apparatus as defined in claim 3 including means to adjust the length of each said flexible line between adjacent floats in accordance with the angle each respective pipe-support section makes with the horizontal.

5. An apparatus as defined in claim 4 including auxiliary vessel means to hold the flexible line between said floats in a taut condition by exerting a pull in a direction opposite to that of the vessel movement.

6. An apparatus as defined in claim 1 wherein said adjustable support means includes cable means connected to each end of each said pipe-support section, and winch means on said float for adjusting the length of each said cable means between said float means and said pipe-support section.

7. An apparatus as defined in claim 1 including flexible lines connecting said pipe-support sections of said stinger means.

8. An apparatus for laying pipe in water covered areas from a vessel supported by such body of water which comprises:
- a stinger means comprising a plurality of pipe-support sections, including means connecting such sections whereby said sections can pivot with respect to each other to provide a substantially continuous support for said pipe, one end of said stinger means supported by said vessel;
- float means for supporting said pipe-support sections;
- said means connecting said pipe-support sections including flexible lines connecting adjacent floats and including vessel means to hold the flexible line between said floats in a taut condition by exerting a pull in a direction opposite to that of the vessel movement;
- adjustable means vertically supporting each said pipe-support section from said float means, at a predetermined depth below the surface of said water, said float means having sufficient buoyancy to remain afloat while supporting said stinger means.

9. An apparatus for laying pipe in water covered areas from a vessel supported by such body of water which comprises:
- a stinger means comprising a plurality of pipe-support sections, including means connecting such sections whereby said sections can pivot with respect to each other to provide a substantially continuous support for said pipe, one end of said stinger means supported by said vessel;
- float means for supporting said pipe-support sections;
- adjustable means vertically supporting each said pipe-support section from said float means, at a predetermined depth below the surface of said water, said float means having sufficient buoyancy to remain afloat while supporting said stinger means;
- said adjustable support means include cable means connected to each end of each said pipe-support section, and winch means on said float for adjusting the length of each said cable means between said float means and said pipe-support section.

References Cited

UNITED STATES PATENTS

| 2,910,835 | 11/1959 | Timothy | 61—72.3 |
| 3,273,346 | 9/1966 | Delaruelle et al. | 61—72.3 |
| 3,438,213 | 4/1969 | Broussard et al. | 61—72.3 |

FOREIGN PATENTS

| 667,802 | 7/1963 | Canada | 61—72.3 |

JACOB SHAPIRO, Primary Examiner

U.S. Cl. X.R.

114—.5